(12) United States Patent
Owensby

(10) Patent No.: US 6,188,043 B1
(45) Date of Patent: Feb. 13, 2001

(54) METHOD FOR MAKING PERMEABLE FILM

(75) Inventor: Joseph E. Owensby, Spartanburg, SC (US)

(73) Assignee: Cryovac, Inc., Duncan, SC (US)

( * ) Notice: Under 35 U.S.C. 154(b), the term of this patent shall be extended for 0 days.

(21) Appl. No.: 09/200,385

(22) Filed: Nov. 24, 1998

(51) Int. Cl.$^7$ ....................................... H05B 7/18
(52) U.S. Cl. ............................. 219/384; 264/154
(58) Field of Search ........................... 219/384; 264/154, 264/41

(56) References Cited

U.S. PATENT DOCUMENTS

| | | | |
|---|---|---|---|
| 692,989 | * | 2/1902 | Davis ................................... 219/384 |
| 3,594,261 | * | 7/1971 | Broerman ............................. 219/384 |
| 3,622,751 | * | 11/1971 | Larive .................................. 219/384 |
| 3,665,157 | | 5/1972 | Harada ................................. 219/384 |
| 3,705,291 | | 12/1972 | Thompson ........................... 219/384 |
| 4,007,349 | | 2/1977 | Burley .............................. 219/10.43 |
| 4,534,994 | * | 8/1985 | Field .................................... 219/384 |
| 5,356,497 | * | 10/1994 | Lee ...................................... 219/384 |
| 5,378,879 | | 1/1995 | Monovoukas . |
| 5,451,257 | | 9/1995 | Kagawa et al. . |
| 5,458,951 | | 10/1995 | Kagawa . |
| 5,710,413 | | 1/1998 | King et al. . |

OTHER PUBLICATIONS

The Wiley Encyclopedia of Packaging Technology, Second Edition, p. 826, (John Wiley & Sons 1997).

Kirk–Othmer Encyclopedia of Chemical Technology, Fourth Edition, vol. 12, pp. 243–245, (John Wiley & Sons 1994).

* cited by examiner

*Primary Examiner*—Linda Johnson
(74) *Attorney, Agent, or Firm*—David G. Burleson; Daniel B. Ruble

(57) ABSTRACT

In a method for making a permeable film, a physical force is applied to a film of a first material containing particles of a second material which is different from the first material. The second material has a higher susceptibility to the physical force than does the first material. Applying the physical force to the film affects the particles which in turn affect the first material of the film, thereby increasing permeability of the film.

25 Claims, No Drawings

METHOD FOR MAKING PERMEABLE FILM

BACKGROUND OF THE INVENTION

1. Field of the Invention

The invention relates generally to manufacture of flexible materials for packaging and the like. More particularly, it relates to a method for manufacturing permeable films.

2. Background Information

In the packaging industry, allowing oxygen to permeate a film or package so as to contact a product contained therein often is desired. For example, a package utilizing a permeable film can permit oxygen to permeate to a fresh red meat product in the package, thereby allowing the meat product to oxygenate (sometimes called blooming). This can enhance consumer appeal, and retail vendors of such meat products have begun to demand this type of capability. Additionally, many types of produce require the presence of oxygen to suppress anaerobic spoilage.

To obtain sufficient permeability, films frequently are treated with mechanical perforating mechanisms. Unfortunately, mechanical perforation is expensive and cannot be accomplished easily after film manufacture or packaging by, for example, retail vendors. Furthermore, providing perforations which are sufficiently small and uniform in size is a not insubstantial challenge using presently available mechanical perforating techniques.

The need remains for an efficient, cost-effective, versatile method of making permeable films.

SUMMARY OF THE INVENTION

According to the present invention, a method for making permeable film is provided. The film advantageously can be made permeable before or after packaging, and permeability is provided through small and substantially uniform perforations as desired.

Briefly, the present invention provides a relatively uncomplicated, inexpensive method for making a permeable film. The method involves applying a physical force to a film of a first material that contains particles of a second (different) material which has a higher susceptibility to the physical force than the first material. Application of the physical force affects the second material which acts on the first material so as to form holes, thereby increasing permeability of the film. The second material can be particles or flakes derived from one or more of a metal, carbon black, ferromagnetic material, or the like. The physical force may be one or more of inductive heating, infrared heating, magnetic force, ultrasonic excitation, microwave irradiation, electron beam (e-beam) irradiation, mechanical stretching, or the like.

In another aspect, the present invention provides a method for making a permeable package. The method involves applying a physical force to a package that includes a product and the above-described film. As before, application of the physical force to the package affects the second material which, in turn, acts on the first material so as to form holes which allow the product to be exposed to oxygen through the film. Films treated according to this method can be rendered permeable before or after manufacture of the package through simple application of a physical force such as those described immediately above.

DETAILED DESCRIPTION OF ILLUSTRATIVE EMBODIMENTS

The invention relates to a method for making permeable films and to a method for making packages containing such permeable films. The method of the present invention advantageously allows packaging films to be made permeable at any desired point along the process of film manufacture, package making, shipping, and display.

According to the invention, films are made permeable by initially providing a packaging film made one or more of the polymeric materials commonly used in the manufacture of packaging films such as, for example, any one or more of a wide variety of olefinic resins (e.g., $C_2$–$C_{12}$ α-olefins), poly(vinyl chloride), ionomers, nylons, or other such polymers. Many homo- and co-polymers of ethylene are used in a wide variety of packaging films. The polymer(s) is/are referred to herein as a first phase or first material.

The film may include more than one layer. The layers of such a film can be classified according to their purpose such as, for example, food-contact layer, sealant layer(s), abuse layer(s), bulk layer(s), oxygen barrier layer(s), moisture barrier layer(s), tie layer(s), etc. Those of ordinary skill in the art are aware of the plethora of polymers and polymer blends that can be included in each of the foregoing. The following are some non-limiting examples of combinations in which letters are used to represent film layers:

A, A/B, A/B/A, A/B/C, A/B/D, A/B/E, A/B/C/D, A/B/C/E, A/B/E/E',

A/B/D/E, A/B/D/C, A/B/C/B/A, A/B/C/D/A, A/B/E/B/A, A/B/C/D/E,

A/B/C/E/D, A/B/D/C/D, A/B/D/C/E, A/B/D/E/C, A/B/D/E/E',

A/B/E/C/E, A/B/E/C/D, A/B/E/C/D, A/B/E/D/D', A/B/E/D/E wherein:

A represents a food-contact layer and/or a sealant layer;

B represents a bulk layer or a sealant layer (depending on whether it is present as an inner or outer layer of the film);

C represents a layer including a polymer having a low permeance to oxygen and/or moisture;

D and D' represent bulk and/or abuse layers (depending on whether they are present as an inner or outer layer of the film); and E and E' represent abuse layers.

Of course, one or more tie layers can be used in any of the above structures.

Additionally, adjacent layers may have different compositions.

Regardless of the structure of the film, one or more conventional packaging film additives can be included therein. Preferably, such additives do not interfere with or hinder the perforating action of the above-described second material. Examples of additives that can be incorporated include, but are not limited to, antiblocking agents, antifogging agents, slip agents, colorants, flavorants, antimicrobial agents, meat preservatives, and the like. Where the multilayer film to be processed at high speeds, inclusion of one or more antiblocking agents in and/or on one or both outer layers of the film structure can be used. Examples of useful antiblocking agents for certain applications include corn starch and ceramic microspheres.

The film of the present invention preferably exhibits a sufficient Young's modulus so as to withstand normal handling and use conditions of, for example, at least about 200 MHa, more preferably at least about 300 MPa, and most preferably at least about 400 MPa. (Young's modulus is measured in accordance with ASTM D 882, the teaching of which is incorporated herein by reference.)

The film may exhibit a shrink tension in at least one direction of at least about 0.33 MPa, more preferably at least about 0.67 MPa. The film preferably exhibits a shrink tension of from about 0.67 to about 3.5 MPa, more preferably from about 1 to about 3 MPa, and most preferably from about 1.75 to about 2.75 MPa.

The film may be sequentially or biaxially oriented, more preferably biaxially oriented. Orienting involves initially cooling an extruded film to a solid state (by, for example, cascading water or chilled air quenching) followed by reheating the film to within its orientation temperature range and stretching it. The stretching step can be accomplished in many ways such as by, for example, blown bubble or tenter framing techniques, both of which are well known to those skilled in the art. After being heated and stretched, the film can be quenched rapidly while being maintained in its stretched configuration so as to set the oriented molecular configuration. An oriented film can be annealed to reduce or completely eliminate free shrink in one or more directions.

The film can be heat shrinkable. More preferably, the film is biaxially oriented and heat shrinkable. Even more preferably, the film is biaxially oriented and has a free shrink at 85° C. in each of the longitudinal (L) and transverse (T) directions of at least about 10%, preferably of at least about 15%. If heat-shrinkable, the film preferably has a free shrink at 85° C. in at least one direction (i.e., the L or T direction) of from about 5 to about 70%, more preferably from about 10 to about 50%, and most preferably from about 15 to about 35%. At 85° C., the film preferably has a total free shrink (i.e., L+T) of from about 5 to about 150%, more preferably from about 10 to about 125%, even more preferably from about 20 about 100%, yet further more preferably from about 40 to about 90%, and most preferably from about 45 to about 85%. (As used herein, "free shrink" refers to the percent dimensional change in a 10 cm×10 cm specimen of film when shrunk at 85° C. in accordance with ASTM D 2732, as set forth in the 1990 *Annual Book of ASTM Standards*, vol. 08.02, pp. 368–71, the teaching of which is incorporated herein by reference.

The measurement of optical properties of plastic films, including the measurement of total transmission, haze, clarity, and gloss, is discussed in detail in Pike, LeRoy, "Optical Properties of Packaging Materials", *Journal of Plastic Film & Sheeting*, vol. 9, no. 3, pp. 173–80 (July 1993), which is incorporated herein by reference. Specifically, haze is a measurement of the transmitted light scattered more than 2.5° from the axis of the incident light The haze of a particular film is determined by analyzing it in accordance with 1990 *Annual Book of ASTM Standards*, section 8, vol. 08.01, ASTM D 1003, "Standard Test Method for Haze and Luminous Transmittance of Transparent Plastics", pp. 358–63, which is incorporated herein by reference. Haze results can be obtained using instrumentation such as, for example, an XL211 HAZEGARD™ system, (Gardner/Neotec Instrument Division; Silver Spring Md.), which requires a minimum sample size of about 6.5 cm². The film preferably has a haze of less than about 20%, more preferably of less than about 15%, even more preferably less than about 10%, still more preferably less than about 7.5%, and most preferably less than about 5%.

As used herein, "thickness uniformity" refers to a percent value obtained from the formula $$U_t = 100 - [(t_{max} - t_{min})/t_{max}] \times 100]$$

where $U_t$ is thickness uniformity (calculated as a percentage), $t_{max}$ is the measured maximum thickness, and $t_{min}$ is the measured minimum thickness. The maximum and minimum thicknesses are determined by taking a number of thickness measurements (e.g., 10) at regular distance intervals along the entirety of the transverse direction of a film sample, recording the highest and lowest thickness values as the maximum and minimum thickness values, respectively, and computing the thickness uniformity (a percent value) using the formula above. A thickness uniformity of 100% represents a film with perfect uniformity, i.e., no measurable differences in thickness. A film in which the film $t_{min}$ is measured at 45% of the film $t_{max}$ has a thickness uniformity of only 45%. The film preferably has a thickness uniformity of at least 30%, more preferably at least 50%, still more preferably at least 70%, and most preferably at least 85%.

The film can have any total thickness as long as the film provides the desired properties for the particular packaging operation to be used. Nevertheless, the film preferably has a total thickness of from about 0.0075 to about 0.25 mm, more preferably from about 0.0125 to about 0.125 mm, more preferably from about 0.025 to about 0.1 mm, even more preferably from about 0.0375 to about 0.09 mm, and most preferably from about 0.045 to about 0.075 mm.

The film can be irradiated (by, e.g., subjecting it to radiation from a high energy source such as a high energy electron generator) so as to alter the surface of the film and/or induce crosslinking between molecules of the polymers contained therein. The use of ionizing radiation for crosslinking polymers present in a film structure is disclosed in, for example, U.S. Pat. No. 4,064,296 (Bornstein et al.), the teaching of which is incorporated herein by reference.

If desired or necessary to increase adhesion to an enclosed meat product, all or a portion of the film can be corona and/or plasma treated. These and similar oxidizing treatments involve bringing a film material into the proximity of an $O_2$- or $N_2$-containing gas (e.g., ambient air) which has been ionized. Various forms of oxidizing treatments known to those of ordinary skill in the art can be used to treat an outer surface of a thermoplastic film material. Exemplary techniques are described in, for example, U.S. Pat. Nos. 4,120,716 (Bonet) and 4,879,430 (Hoffman), the disclosures of which are incorporated herein by reference. Where the film is intended to adhere to an enclosed proteinaceous food product, regardless of whether or not the film is subjected to such an oxidizing treatment, at least the inside (i.e., protein contact) layer thereof preferably has a surface energy of at least about 0.032 J/m², more preferably at least about 0.034 J/m², even more preferably at least about 0.036 J/m², still more preferably at least about 0.038 J/m², yet still more preferably at least about 0.040 J/m², even further more preferably at least about 0.042 J/m², and most preferably at least about 0.044 J/m².

In another embodiment, especially where the film is to be used with whole muscle products, the food-contact layer of the film preferably is relatively non-polar. In such applications, providing a food-contact layer with a low surface energy can be desirable so as to avoid pulling off chunks of the whole muscle product when the film is stripped from the product. In such instances, the surface energy of the layer in question preferably is less than about 0.034 J/m², more preferably less than about 0.032 J/m², and most preferably less than about 0.030 J/m².

Where the film is to be used in a cook-in application, it preferably can survive cooking for at least two hours without undergoing delamination or seal failure at about at least 65° C., more preferably at about at least 70° C., even more preferably at about at least 75° C., still more preferably at about at least 80° C., and most preferably at about at least 85° C. Preferably, the film of the present invention is capable of surviving cooking at the foregoing temperatures for at least about 3 hours, more preferably at least about 5 hours, and most preferably at least about 8 hours.

During film manufacture, particles (i.e., the second material) are incorporated into the film. The particles are selected of a material different from that of the film. The material(s) from which the particles are made herein is referred to as a second phase or second material. The second material is selected so that it has a higher susceptibility to a physical force than the first material of the film. Due to this specific selection of properties, the application of the specific physical force to the film serves to preferentially affect the particles while having little or no direct affect on the polymeric material(s) from which the film is formed. Depending upon the nature of the particles and physical force, the particles may be heated, rapidly moved, removed or the like so as to act locally upon the film and increase permeability thereof through the provision of relatively small and substantially uniform perforations through the film. The particles in turn act locally upon the film so as to create holes or perforations in the film and thereby increase permeability thereof If desired, the perforations can be made relatively small and substantially uniform through the film.

The particles can be provided of a solid material, for example metal, carbon black, ferromagnetic material, or mixtures thereof Particles preferably have a size which can produce the desired size of perforations to be formed in the film and a diameter or size substantially the same as the film thickness. For example, particles can be provided having a size of less than or equal to about 13 $\mu$m (0.5 mil) in a film having a thickness of about 13 $\mu$m (0.5 mil); resulting perforations can have a diameter of approximately 75 $\mu$m (3 mil). The resulting perforations can be substantially uniform, typically at least about 80% of the perforations being within approximately 0.04 mm of the median perforation size.

Particles advantageously can be loaded into the film layer(s) to be rendered permeable in an amount between about 0.4% and about 4%, preferably between about 0.5% and about 3.5%, more preferably between about 0.6% and about 3%, with all of the foregoing percentages being based on weight of the film. Particles can have a diameter of between about 2.5 $\mu$m (0.1 mil) and about 25 $\mu$m (1 mil), preferably between about 5 $\mu$m (0.2 mil) and about 18 $\mu$m (0.7 mil). Film thickness and particle size can be selected to be substantially the same, and the film layer preferably has a thickness of less than or equal to about 50 $\mu$m (2 mils).

The particles can be incorporated into any layer(s) of a film as long as they are able to form the desired size and number of perforations in the desired layer(s) of the film. Of course, where the particles used include one or more which are not governmentally approved for food contact, such particles preferably are not present in the inside layer of a film used to package food items.

As set forth above, incorporation of particles in the film serves to provide a film which can be treated with a physical force to which the particles are susceptible. Application of this force affects and/or removes the particles so as to perforate the film and increase the permeability thereof Examples of physical forces which can be used in the method of the present invention include spark discharge, inductive heating, infrared heating, magnetic force, ultrasonic excitation, microwave irradiation, e-beam irradiation, laser irradiation, mechanical stretching, or combinations thereof Particular combinations of particles and useful physical forces include metal particles acted upon by inductive heating so as to increase the surface temperature of the metal particles, thereby melting a hole in the film. Also advantageously used together are carbon black particles which can be subjected to infrared heating whereby the particles are heated and melt the film. Ferromagnetic particles can be incorporated into the film and acted upon using a magnetic force, for example a magnetic induction force, so as to completely remove the particles from the film and thereby provide enhanced permeability as compared to non-treated film or film treated without particles.

Some films may include additives such as slip and/or antiblock agents (which typically are applied to or migrate to outside surfaces of the film) which make conventional perforation difficult or unpredictable. However such films are readily perforated using high voltage spark or spark discharge on films including particles as set forth above, which itself is an improvement. Perforations thus formed have a small size, for example less than or equal to about 0.1 mm (4 mil), preferably no more than about 75 $\mu$m (3 mil). Such perforations can be substantially uniform. Other combinations of particles and forces can be envisioned by the ordinary skilled artisan.

Specific parameters such as magnitude and duration of force to be applied depend upon the polymeric material(s) used, the size and spacing of particles, film thickness and the like. These variables can be readily determined by a person of ordinary skill in the art so as to provide the desired preferential application of force to particles which in turn act locally on the material of the film so as to form the desired holes in the film without otherwise damaging same.

In each of the aforesaid examples, application of the physical force can be carried out during film manufacture, during package manufacture, or after package manufacture, for example shortly prior to placing a meat package on the shelf Regardless of when perforations are formed, the enhanced permeability can allow oxygen to reach a packaged meat product as frequently is desired.

In accordance with the present invention, application of the physical force can be carried out while the film is under tension, either monoaxially or biaxially. This advantageously serves to provide for the formation of perforations which, after tension on film is released, have a smaller size.

The method of the present invention advantageously can be carried out in the manufacture of single or multilayer films or structures. For example, one layer of a multilayer film advantageously may be provided having particles incorporated therein in accordance with the present invention. This film could be a barrier layer or film of a multilayer structure having oxygen barrier properties. Upon application of the physical force in accordance with the present invention, the barrier layer is perforated so as to render the multilayer structure more permeable. As described previously, this can be used in an environment for the packaging of fresh red meat products.

Alternatively, the packaging film of the present invention can be manufactured and incorporated into a peelable film structure if desired. In multilayer films, those which include a layer containing particles can be manufactured using co-extrusion, lamination and various other film manufacturing techniques known in the art.

As set forth above, the method of the present invention advantageously may be used to provide films and packages including such films wherein permeability can be created in the film during film manufacture, during packaging, or at some stage thereafter. Films incorporating particles as set forth above often have very good optical properties including clarity, and the particles can be nearly invisible to the naked eye.

The present invention is not limited to the illustrations described and shown herein, which are deemed to be merely illustrative and which are susceptible to modification of form, size, arrangement of parts and details of operation. The invention rather is intended to encompass all such modifications which are within its spirit and scope as defined by the claims.

I claim:

1. A method of increasing the permeability of a film comprising:
   providing a film having:
      at least one layer comprising one or more polymeric materials selected from the group consisting of olefinic resins, poly(vinyl chloride), ionomers, nylons, and homo- and co-polymers of ethylene; and
      a plurality of solid particles incorporated into the at least one layer, wherein the solid particles:
         comprise a particle material different from the one or more polymeric materials; and
         have a higher susceptibility to a selected physical force than does the one or more polymeric materials; and
   applying the selected physical force to said film so as to affect said particles and create perforations in the at least one layer, whereby the permeability of the at least one layer is increased.

2. A method according to claim 1, wherein the particle material is selected from the group consisting of metal, carbon black, ferromagnetic material and mixtures thereof.

3. A method according to claim 1, wherein said selected physical force is selected from the group consisting of infrared heating, magnetic force, ultrasonic excitation, microwave irradiation, E-beam irradiation, laser irradiation, mechanical stretching and combinations thereof.

4. A method according to claim 1 wherein said selected physical force includes spark discharge.

5. A method according to claim 1, wherein the particle material comprises a metal and wherein said selected physical force includes inductive heating.

6. A method according to claim 5, wherein the particle material includes iron.

7. A method according to claim 1, wherein:
   the particle material includes a ferromagnetic material; and
   the selected physical force includes magnetic induction force.

8. A method according to claim 1, wherein:
   the particle material includes carbon black, and
   the selected physical force includes infrared heating.

9. A method according to claim 1, wherein the selected physical force is applied while said film is under tension.

10. A method according to claim 1, wherein said providing step includes providing a film having at least two layers.

11. A method according to claim 1, wherein said particles have a size of between about 2.5 $\mu$m and about 25 $\mu$m.

12. A method according to claim 1, wherein the at least one layer incorporates said particles in an amount of between about 0.4% and about 4% based on the weight of said film.

13. The method of claim 1 wherein the providing step includes providing a film having a Young's modulus as measured by ASTM D882 of at least about 200 MPa.

14. The method of claim 1 wherein the providing step includes providing an oriented film.

15. The method of claim 1 wherein the providing step includes providing a heat-shrinkable film having a total free shrink of from about 5% to about 150% at 85° C. in accordance with ASTM D2732.

16. A method of increasing the permeability of a film comprising:
   providing a film having:
      at least one layer comprising a first material; and
      a plurality of solid particles incorporated into the at least one layer, wherein the solid particles:
         comprise a second material different from the first material; and
         have a higher susceptibility than the first material to a selected physical force selected from the group consisting of inductive heating, infrared heating, magnetic force, ultrasonic excitation, microwave irradiation, e-beam irradiation, laser irradiation, and mechanical stretching; and
   applying the selected physical force to the film to affect the particles and create perforations in the at least one layer, whereby the permeability of the at least one layer is increased.

17. The method of claim 16 wherein the selected physical force is selected from the group consisting of infrared heating, magnetic force, ultrasonic excitation, microwave irradiation, e-beam irradiation, and laser irradiation.

18. The method of claim 16 wherein the first material is a polymeric material selected from the group consisting of olefinic resins, poly(vinyl chloride), ionomers, nylons, and homo- and co-polymers of ethylene.

19. The method of claim 16 wherein the providing step includes providing a film having at least two layers.

20. The method of claim 16 wherein the providing step includes providing a film having a Young's modulus as measured by ASTM D882 of at least about 200 MPa.

21. The method of claim 16 wherein the providing step includes providing an oriented film.

22. The method of claim 16 wherein the providing step includes providing a heat-shrinkable film having a total free shrink of from about 5% to about 150% at 85° C. in accordance with ASTM D2732.

23. The method of claim 16 wherein the at least one layer incorporates the particles in an amount of between about 0.4% and about 4% based on the weight of the film.

24. The method of claim 16 wherein the second material is selected from the group consisting of metal, carbon black, ferromagnetic material, and mixtures thereof.

25. A method of increasing the permeability of a film comprising:
   providing an oriented, heat-shrinkable film having:
      a Young's modulus as measured by ASTM D882 of at least about 200 MPa;
      a total free shrink of from about 5% to about 150% at 85° C. in accordance with ASTM D2732;
      at least one layer comprising a first material; and
      a plurality of solid particles incorporated into the at least one layer, wherein the solid particles:
         comprise a second particle material different from the first material; and
         have a higher susceptibility than the first material to a selected physical force; and
   applying the selected physical force to said film so as to affect said particles and create perforations in the at least one layer, whereby the permeability of the at least one layer is increased.

* * * * *